United States Patent

[11] 3,591,903

| [72] | Inventor | Arnold G. Bowles<br>Warren, Pa. |
|---|---|---|
| [21] | Appl. No. | 866,513 |
| [22] | Filed | Oct. 15, 1969 |
| [45] | Patented | July 13, 1971 |
| [73] | Assignee | National Forge Company<br>Irvine, Pa. |

[54] ISOSTATIC PRESS WITH MULTIPART MOLD
6 Claims, 5 Drawing Figs.

[52] U.S. Cl.................................................. 25/45,
18/5 H, 18/DIG. 44
[51] Int. Cl..................................................... B28b 3/00
[50] Field of Search............................................ 25/45; 18/5
H

[56] References Cited
UNITED STATES PATENTS

| 2,152,738 | 4/1939 | Jeffery........................ | 264/313 |
| 3,034,191 | 5/1962 | Schaefer et al. .............. | 25/45 |
| 3,193,900 | 7/1965 | Wendt......................... | 18/5 H X |
| 3,220,103 | 1/1965 | Simons......................... | 29/421 |
| 3,239,591 | 3/1966 | Wendt.......................... | 264/314 |
| 3,313,871 | 4/1967 | Vogel et al...................... | 18/5 H X |
| 3,454,997 | 7/1969 | Lignon ......................... | 25/30 |
| 3,477,096 | 1/1969 | Bowles et al.................... | 18/5 H |

*Primary Examiner*—J. Howard Flint, Jr.
*Attorney*—Charles B. Smith

ABSTRACT: A multipart mold for an isostatic press, the mold including an elastomeric container having a cavity for receiving a powder to be isostatically compressed, the container having a first part mounted in fixed position in a fluid pressure chamber, a second part extending through the container to the cavity which, when removed, forms a passage for the powder to be compressed, and a third part which, when the powder is compressed, for a support for the molded powder and for removing the molded article.

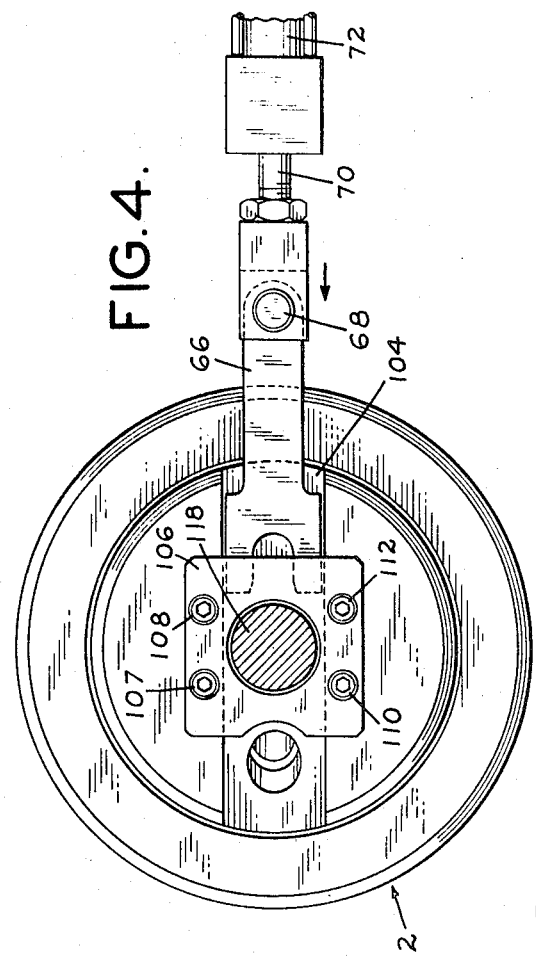
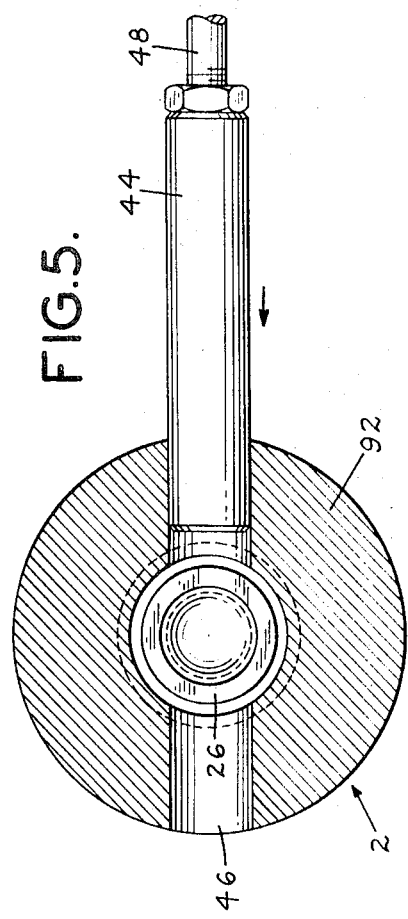
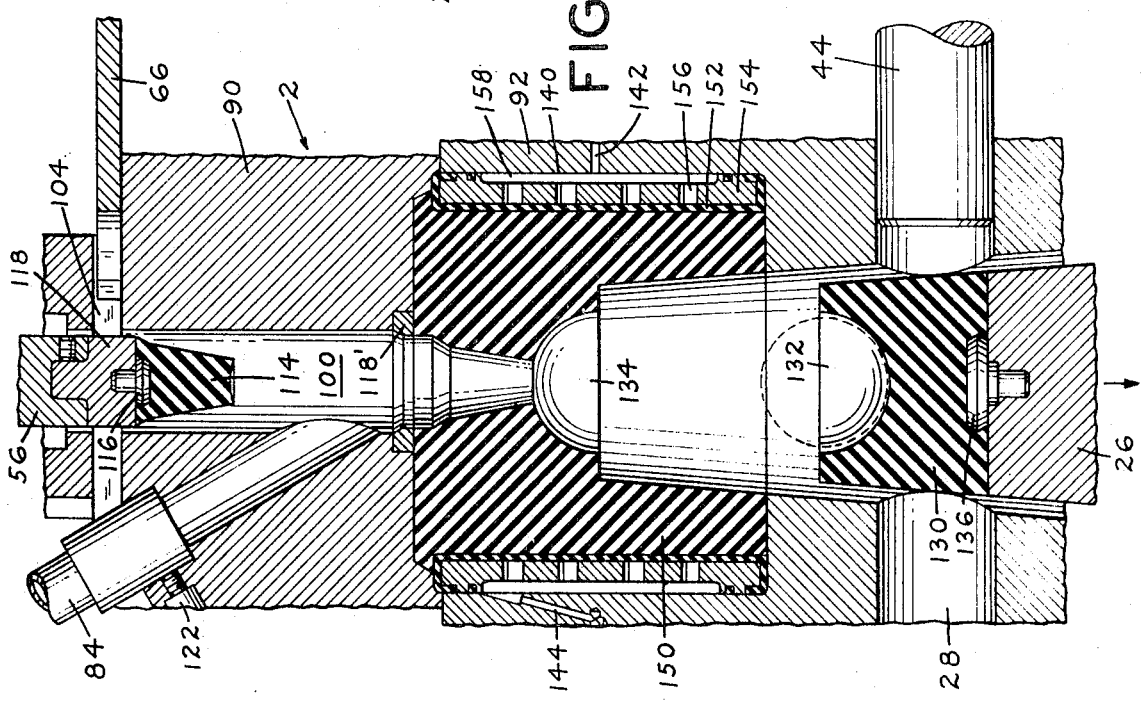

ISOSTATIC PRESS WITH MULTIPART MOLD

This invention relates to a multipart mold for isostatic molding and, more particularly, to such a mold wherein the material to be molded is fed into the mold cavity and the molded article is removed from opposite ends of the mold.

In the isostatic pressing of ceramics, clays, porcelains and the like, such as in the isostatic molding of insulators, i.e., spark plug insulators, a metered amount of powder is fed into the cavity of an elastomeric container, usually rubber, from the top of the cavity. The end of a mandrel is then inserted into the cavity, the cavity and container are sealed around the end of the mandrel and the pressure chamber is pressurized, usually hydraulically. Hydraulic pressure on the elastomeric container compresses the container and compacts the powder in the container around the end of the mandrel. The pressure in the chamber is then released. As the pressure is released, the elastomeric container expands and, in expanding, releases the compacted powder which is now molded into a self-contained article of a shape determined by the inner configuration of the container cavity. The powder is compacted onto the end of the mandrel and is withdrawn from the cavity with the mandrel. The molded article is then removed from the mandrel and, usually, is heated, or "fired" and, after firing, may be machined, ground, or the like, into the desired, final shape.

The end of the mandrel inserted into the cavity and around which the powder is compacted and molded provides a convenient arrangement for removing the molded article from the mold cavity and transferring such molded article to conveyor means for further processing. However, when such molded article is removed from the mandrel, a hole or void is left in the article where the mandrel was removed which, for the isostatic molding of some articles, is not acceptable.

The instant invention provides a mold for isostatic pressing or molding of ceramics, clays, porcelains, powdered metals, and the like, wherein the use of a mandrel inserted into the mold cavity around which the powder is compacted and molded is avoided. Additionally, the instant invention provides apparatus wherein the isostatic molded article may be withdrawn from the mold and transferred to conveyor means for further processing. All of this is accomplished in the instant invention by a multipart mold in which part of the elastomeric container is mounted in fixed position in the pressure chamber and part of the elastomeric container is removable. The fixed and removable parts, when assembled in the pressure chamber, make up the mold cavity and, when the pressure chamber is pressurized, compacting and molding the powder in the cavity into a self-suspended article of a shape determined by the inner configuration of the cavity. The pressure is released and, preferably, a negative pressure is applied to return the container to its relaxed, or normal shape as rapidly as possible. With the elastomeric container relaxed and in its normal shape, the compact, molded, self-sustained article rests on, and is supported by, a removable part of the container. The mold is unlocked and the movable part, with the molded article resting thereon, is removed.

In the instant apparatus, the metered charge of powdered material is fed, by gravity from a suitable metering means, into the cavity from the top of the cavity, after the movable part of the elastomeric container upon which the molded article, after the powder is isostatically compressed, will rest and be removed, is locked in position. After the metered amount of powder is fed into the cavity, the upper end of the cavity is sealed and locked. The pressure chamber is pressurized and the powder is molded.

The invention will be more fully understood from the following description and appended drawings in which:

FIG. 3 is an enlarged view, partially broken away, similar to FIG. 2 but showing the mold unlocked with the removable parts withdrawn;

FIG. 4 is an enlarged view taken at 4-4, FIG. 1; and

FIG. 5 is an enlarged view taken at 5-5, FIG. 1.

Figure 1:
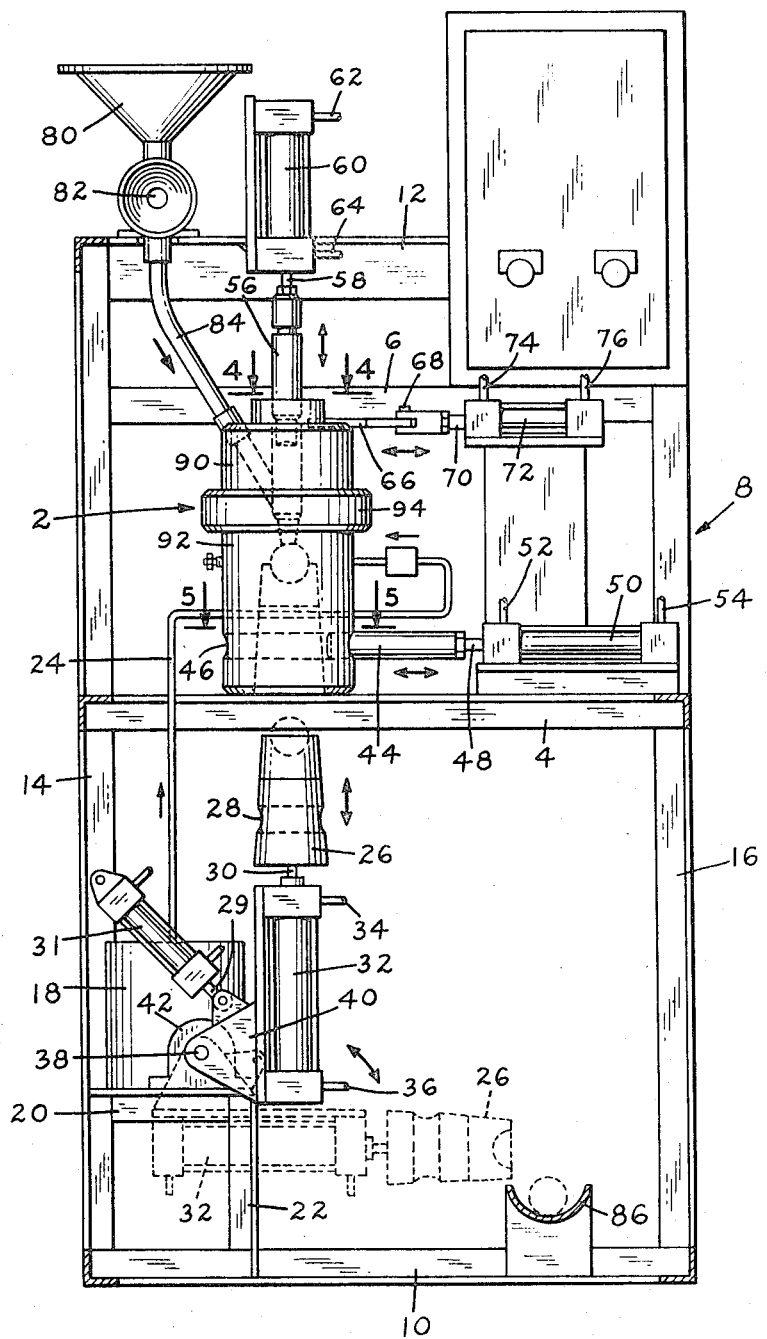
FIG. 1 is a side elevation view of the apparatus of the instant invention.
Figure 2:
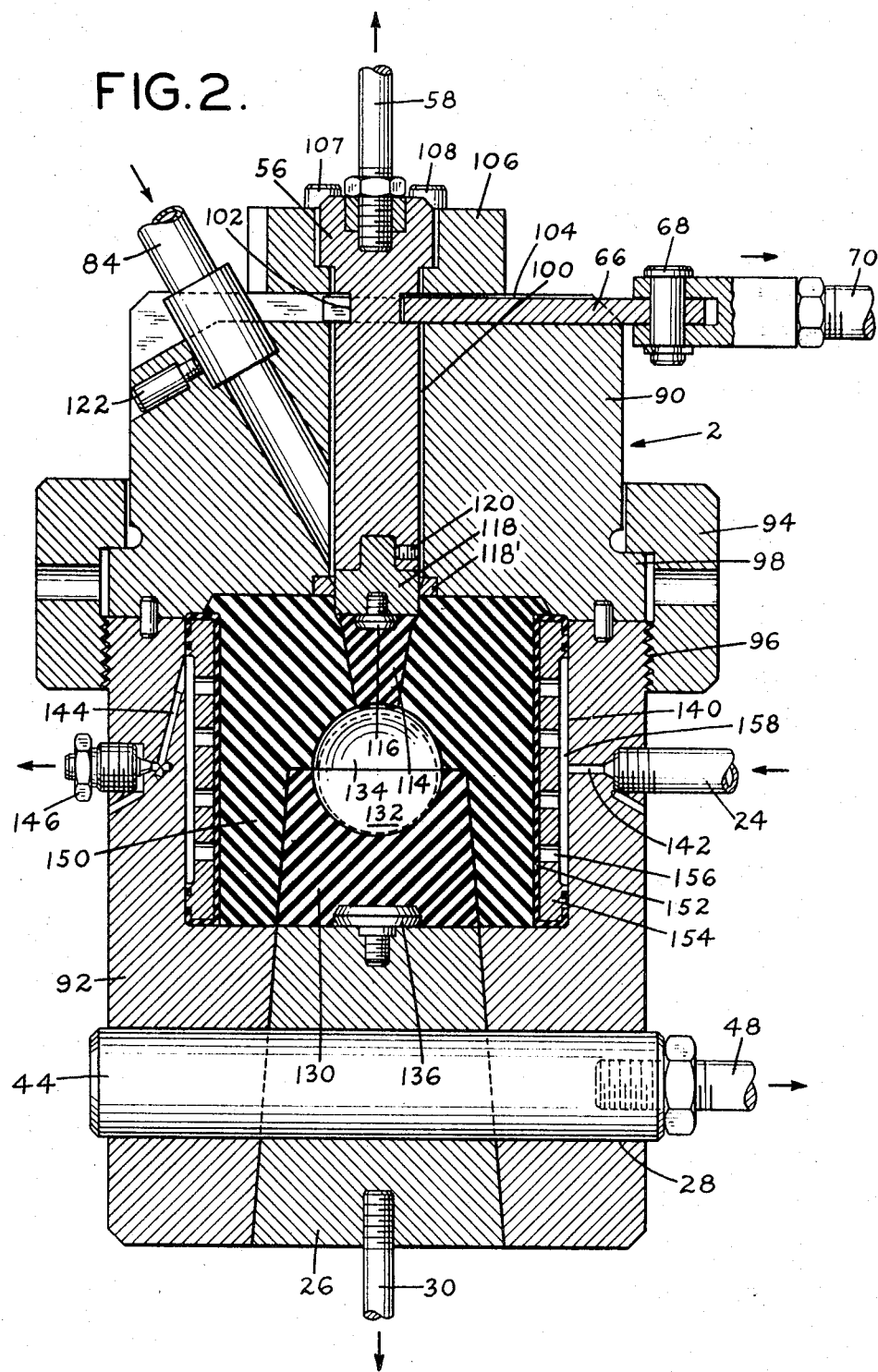
FIG. 2 is an enlarged sectional view of the mold of FIG. 1 but showing the mold assembled and locked.

Referring to the drawings, particularly FIG. 1, pressure vessel, generally designated 2, is mounted between crossmembers 4, 6 of a frame, generally designated 8, having bottom crossmember 10 and upper crossmember 12 and side members 14, 16. Hydraulic pump 18 is mounted on frame member 20 supported by frame member 22 and is connected by hydraulic line 24 to cylinder 2. Lower pressure vessel sealing plug 26, having bore 28 extending therethrough, is mounted on the end of piston rod 30 of the piston of double acting cylinder 32 having fluid pressure inlets-outlets 34, 36. Cylinder 32 and lower pressure vessel sealing plug 26 are pivotally mounted, by pivot 38 and bracket 40, fixed to cylinder 32, on support 42 fixed to frame member 20 for purposes hereinafter described.

Piston rod 29 of the piston of double acting cylinder 31 is pivotally connected to bracket 40 and cylinder 31 is pivotally connected to frame member 14.

Locking pin 44, in axial alignment with bore 46, in pressure vessel 2 and bore 28 in lower pressure vessel sealing plug 26, when such sealing plug is inserted in pressure vessel 2, is fixed to piston rod 48 of the piston of double acting cylinder 50 having fluid pressure inlets-outlets 52, 54.

Upper pressure vessel sealing plug 56 is fixed to piston rod 58 of the piston of double acting cylinder 60 having fluid pressures inlets-outlets 62, 64. Upper sealing plug locking plate 66 is connected, by pivot pin 68, to the end of piston rod 70 of the piston of double acting cylinder 72 having fluid inlets-outlets 74, 76. Powder supply tank 80 is connected, through metering valve 82, to supply conduit 84 which, as will be more fully described, delivers a metered amount of powdered material from supply tank 80, through metering valve 82, to the mold cavity in pressure vessel 2. Conveyor 86 is mounted on lower frame member 10 for receiving molded articles and transferring such articles to further processing stations.

Referring to FIGS. 2 to 5, pressure vessel 2 includes upper housing 90 and lower housing 92, interconnected by collar 94 threaded onto threads 96 on lower housing 92 and engaging shoulder 98 on upper housing 90. Bore 100, having a diameter slightly larger than upper pressure vessel sealing plug 56 to provide clearance for the removal and insertion of plug 56, but not clearance in excess thereof, extends through upper housing 90.

Plug 56 has a groove 102 for receiving the forked end of locking plate 66. Plate 66 is mounted in groove 104, FIG. 4, in the upper end of upper housing 90 and reciprocates in such groove, as will be later described, under locking cap 106 mounted on the top of housing 90 by screws 107, 108, 110, 112. Elastomeric plug 114 is mounted on button 116 threaded into replaceable end 118 fixed, by set screw 120 to the lower end of sealing plug 56. The outer surface of plug 114 is tapered, as shown. Replaceable end 118 is seated in a tight fitting ring 118' which fits in an annular recess in housing 90.

Conduit 84 extends into upper housing 90 and is held therein by set screw 122. The lower end of conduit 84 opens into bore 100 for purposes later described.

Elastomeric plug 130, continued at its upper surface 132 to form a part of the wall of mold cavity 134, is mounted on button 136 threaded into the end of lower pressure vessel sealing plug 26.

Pressure chamber 140 in lower housing 92 is connected, by post 142, to hydraulic line 24 and, by post 144, to air bleeder valve 146. Air bleeder valve 146, for purposes more apparent hereinafter, is opened and closed during initial startup to bleed and purge air from pressure chamber 140 when chamber 140 is initially pressurized with hydraulic fluid from hydraulic line 24.

Elastomeric container 150 which, along with elastomeric plugs 114, 130, makes up cavity 134, and all of which are of the same elastomeric material having the same elastomeric properties, is mounted in pressure chamber 140 in elastomeric pressure bag 152, clamped, at its opposite ends, by the ends of sleeve 154 and the abutting walls of pressure chamber 140. Ports 156 extend through sleeve 154, connecting clearance 158, between sleeve 154 and the wall of pressure chamber 140, with pressure bag 152 side of sleeve 154 for purposes more apparent hereinafter.

In the illustrated embodiment, mold cavity 134 is contoured to make a sphere and the surfaces of elastomeric plugs 114, 130 and elastomeric container 150 which, when assembled, form the mold cavity, are shaped accordingly. Other shapes, by appropriate contouring of the mold cavity, may also be isostatically molded with the apparatus of the instant invention, the embodiment shown being only illustrative.

In the operation of the instant apparatus, lower vessel sealing plug 26, with elastomeric plug 130 affixed thereto, is inserted into the lower end of housing 92 and locked therein by locking pin 44 engaged in bores 28, 46. Pin 44 is advanced into bores 28, 48 and engaged therein by actuating double acting cylinder 50 after double acting cylinder 32 has been actuated to insert plug 26 into housing 92.

With plug 26 inserted and locked in housing 92, a metered amount of powder to be isostatically molded is fed from supply tank 80, through metering valve 82, which may be of the type shown and described in U.S. patent application Ser. No. 796,429, filed Feb. 4, 1969, and through supply conduit 84 into cavity 134. Double acting cylinder 60 is then actuated to insert upper pressure vessel sealing plug 56, with elastomeric plug 114 affixed thereto, through bore 100 to align groove 102 in plug 56 with groove 104 in the upper end of upper housing 90. Double acting cylinder 72 is then actuated, advancing locking plate 66 and engaging the forked end of plate 66 with groove 102. With upper and lower pressure vessel sealing plugs in place and locked, hydraulic fluid, at the required molding pressure, is admitted to pressure chamber 140, any air in such chamber been purged by opening and closing bleeder valve 146.

After hydraulic pressure in chamber 140 has reached the desired pressure to compress the elastomeric container and the powder therein, the hydraulic pressure is released and, preferably, a slight negative pressure is applied to the elastomeric container. Double acting cylinder 50 is then actuated to withdraw locking pin 44 from bores 28, 46. With locking pin 44 withdrawn, double acting cylinder 32 is actuated, lowering plug 26, elastomeric plug 130 affixed thereto and the molded article resting on the cavity surface of elastomeric plug 130 from lower pressure vessel housing 92.

When plug 26 reaches its lowermost position, double acting cylinder 31 is actuated, tipping cylinder 32, piston rod 30, and plug 26, with elastomeric plug 130 and the molded article resting thereon, from the vertical, full line position, FIG. 1, to the horizontal, phantom line position. The molded article rolls off of elastomeric plug 130 onto conveyor 86 and is transferred to the next processing station. Double acting cylinder 31 is then activated in the reverse position, returning cylinder 32, piston rod 30, plug 26 and elastomeric plug 130 to the vertical, full line position for the next operating cycle.

As cylinder 50 withdraws locking pin 44 and double acting cylinder lowers plug 26, double acting cylinder 72 is activated and withdraws the forked end of locking plate 66 from groove 102, unlocking upper pressure vessel sealing plug 56. Double acting cylinder 60 is then actuated to lift plug 56, and elastomeric plug 114 attached thereto, upwardly out of the compression chamber.

The apparatus of the instant invention may be operated manually by an operator by the manipulation of suitable valves and valve controls operated, in sequence, to advance and retract the various elements in the required order or the apparatus may be adapted for automatic operation in which the elements are controlled and moved in the required order. Where operated manually or automatically, more than one pressure vessel and associated components may be incorporated in a single production machine.

The terms and expressions which have been employed are used as terms of description and not of limitation, and there is no intention in the use of such terms and expressions of excluding any equivalents of the features shown and described or portions thereof, but it is recognized that various modifications are possible.

What I claim is:

1. An isostatic press for molding of powder, said press having a fluid pressure chamber, an elastomeric container in said fluid pressure chamber, said elastomeric container having a cavity therein for receiving powder to be isostatically compressed and molded, said elastomeric container having a first part mounted in fixed position in said fluid pressure chamber, a second part extending through said container and to said cavity which, when removed, forms a passage for the delivery of powder to be molded to said cavity and a third part extending through said container and to said cavity upon which, when said powder is compressed and molded in said cavity, the molded powder article is supported and means for removing said second and third container parts from, and repositioning said second and third container parts in, said first container part.

2. An isostatic press, as recited in claim 1, in which said means for removing and repositioning said second and third container parts in said first container part includes means for locking said second and third parts in said first part, when said parts are positioned therein.

3. An isostatic press, as recited in claim 2, in which said fluid pressure chamber includes a housing and said locking means includes means on said housing.

4. An isostatic press, as recited in claim 3, in which said press includes means for supplying fluid pressure to said fluid pressure chamber.

5. An isostatic press, as recited in claim 4, in which said fluid pressure chamber includes a sleeve and an elastomeric pressure bag on one side of said sleeve between said sleeve and said elastomeric container.

6. An isostatic press, as recited in claim 5, in which said press includes a conveyor and said means for removing said third part of said elastomeric container includes means for transferring the molded powder article supported thereon to said conveyor.